US012613362B2

(12) United States Patent
Chao et al.

(10) Patent No.: US 12,613,362 B2
(45) Date of Patent: Apr. 28, 2026

(54) OPTICAL ELEMENT DRIVING MECHANISM

(71) Applicant: Actutek Corporation, Taoyuan City (TW)

(72) Inventors: Chen-Hung Chao, Taoyuan City (TW); Shou-Jen Liu, Taoyuan City (TW); Kun-Shih Lin, Taoyuan City (TW); Yi-Ho Chen, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 287 days.

(21) Appl. No.: 18/482,297

(22) Filed: Oct. 6, 2023

(65) Prior Publication Data

US 2025/0116799 A1      Apr. 10, 2025

(51) Int. Cl.
G02B 5/00      (2006.01)

(52) U.S. Cl.
CPC .................................. G02B 5/005 (2013.01)

(58) Field of Classification Search
CPC ...................................................... G02B 5/005
See application file for complete search history.

(56) References Cited

U.S. PATENT DOCUMENTS

| | | | | |
|---|---|---|---|---|
| 2009/0147340 A1* | 6/2009 | Lipton | ................. | H10N 30/883 |
| | | | | 359/230 |
| 2014/0111843 A1* | 4/2014 | Kozu | ....................... | G03B 9/02 |
| | | | | 359/230 |
| 2022/0221625 A1* | 7/2022 | Weng | ....................... | G03B 5/00 |

* cited by examiner

*Primary Examiner* — Charles S Chang

(74) *Attorney, Agent, or Firm* — MUNCY, GEISSLER, OLDS & LOWE, P.C.

(57) ABSTRACT

An optical element driving mechanism is provided. The optical element driving mechanism includes a movable part, a fixed part, and a driving assembly. The movable part connects a plurality of optical elements. The movable part may move relative to the fixed part. The driving assembly drives the movable part to move relative to the fixed part.

19 Claims, 8 Drawing Sheets

OPTICAL ELEMENT DRIVING MECHANISM

CROSS REFERENCE TO RELATED APPLICATIONS

This application claims priority of U.S. Provisional Application No. 63/414,123, filed on Oct. 7, 2022, the entirety of which is incorporated by reference herein.

BACKGROUND OF THE INVENTION

Field of the Invention

The present invention relates to an optical element driving mechanism, and, in particular, to an optical element driving mechanism with a movable part protrusion and a fixed part protrusion.

Description of the Related Art

With the development of science and technology, many electronic devices (such as notebook computers, smartphones, and digital cameras) now have the function of taking photos and recording videos. Apart from the development of more stability and better optical quality, design trends are also moving towards these devices being more convenient and thinner, so as to provide users with more choices. The design of electronic devices is constantly developing towards miniaturization, meaning that the size of various assemblies and structures used in optical modules such as cameras must also be continuously reduced. In view of this, how to design a miniaturized driving mechanism has become an important issue.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an element driving mechanism is provided. The optical element driving mechanism includes a movable part, a fixed part, and a driving assembly. The movable part is for connecting a plurality of optical elements. The movable part is movable relative to the fixed part. The driving assembly is for driving the movable part to move relative to the fixed part.

In some embodiments, the optical element driving mechanism has at least three optical elements.

In some embodiments, the optical element driving mechanism further includes a step part, corresponding to one of the optical elements.

In some embodiments, the optical element driving mechanism further includes a movable part protrusion, and a fixed part protrusion. The movable part protrusion is for driving the optical elements to move relative to the fixed part. The fixed part protrusion is for guiding the optical elements. The movable part protrusion is movable relative to the fixed part protrusion.

In some embodiments, the optical elements are movable relative to the movable part protrusion and the fixed part protrusion.

In some embodiments, the fixed part has a light inlet, wherein the optical axis passes through the light inlet.

In some embodiments, each one of the optical elements includes a movable connection part, a fixed connection part, and a middle part. The movable connection part corresponds to the movable part protrusion. The fixed connection part corresponds to the fixed part protrusion. The movable connection part is connected to the fixed connection part through the middle part. The middle part is located between the movable connection part and the fixed connection part.

In some embodiments, the sides of the middle parts of the optical elements form an opening, and the optical axis passes through the opening.

In some embodiments, the opening has a rotational symmetrical structure and a plurality of vertices.

In some embodiments, when the optical elements are in a first position, the angle of the vertices is approximately 180 degrees.

In some embodiments, when the optical elements are in a second position, the angle of the vertices is less than 180 degrees and greater than or equal to 160 degrees.

In some embodiments, when the optical elements are in the first position, the area of the opening is different from the area of the opening when the optical elements are in the second position.

In some embodiments, when the optical elements are in the first position, the number of vertices is different from the number of vertices when the optical elements are in the second position.

In some embodiments, when the optical elements are in a third position, the angle of the vertices is less than 160 degrees.

In some embodiments, when the optical elements are in the second position, the area of the opening is different from the area of the opening when the optical elements are in the third position.

In some embodiments, when the optical elements are in the second position, the structure of the opening is different from the structure of the opening when the optical elements are in the third position.

In some embodiments, when the optical elements are in the second position, the number of vertices is the same as the number of vertices when the optical elements are in the third position.

In some embodiments, when viewed along the direction parallel to the optical axis, there is a distance between the movable part protrusion and the fixed part protrusion. In some embodiments, the distance is greater than half the maximum size of the light inlet.

In some embodiments, the distance is greater than the maximum size of the light inlet.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 2A is an exploded perspective view of the optical element driving mechanism, according to certain aspects of the present disclosure.

DETAILED DESCRIPTION OF THE INVENTION

Figure 1:
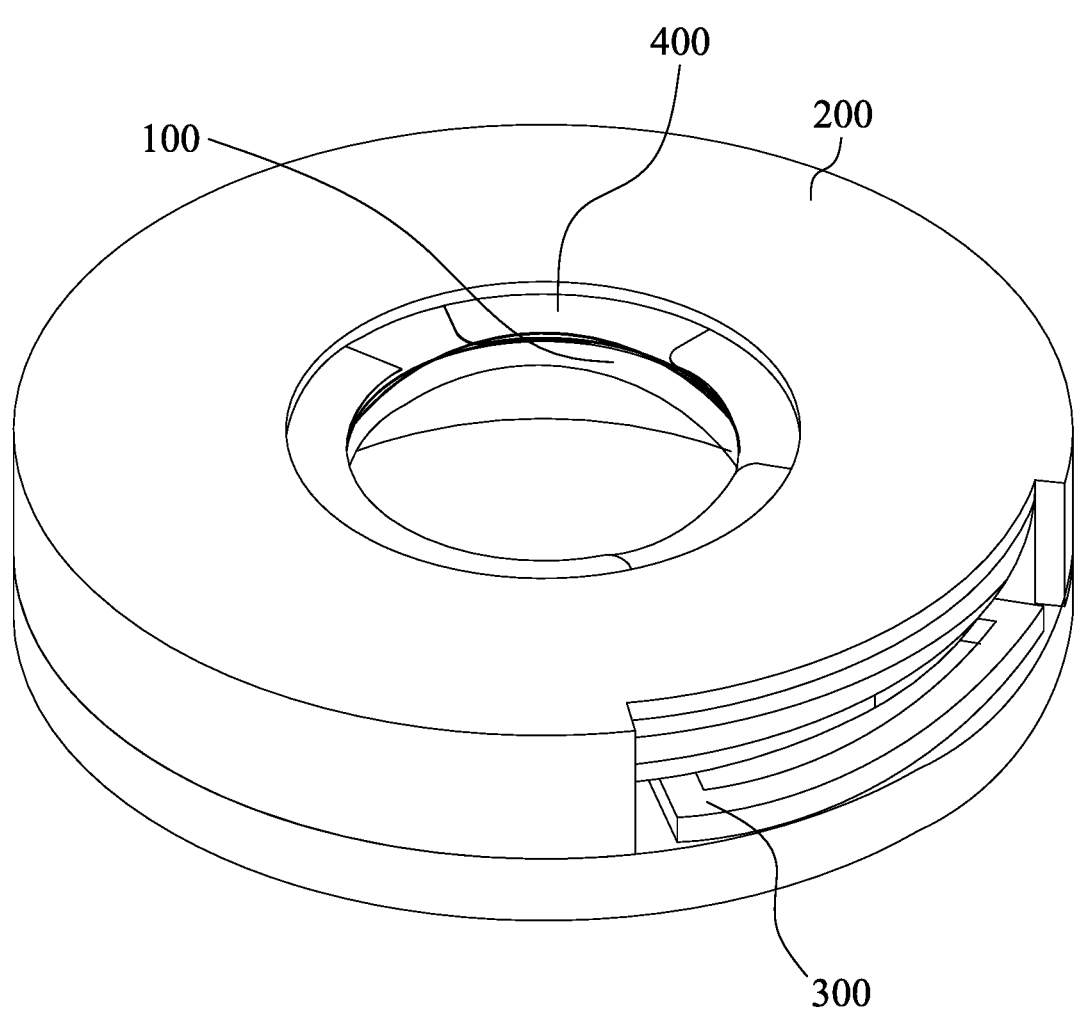
FIG. 1 is a front perspective view of an optical element driving mechanism, according to certain aspects of the present disclosure.
Figure 1:
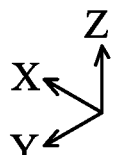

Various embodiments are described with reference to the attached FIGS., where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2A:
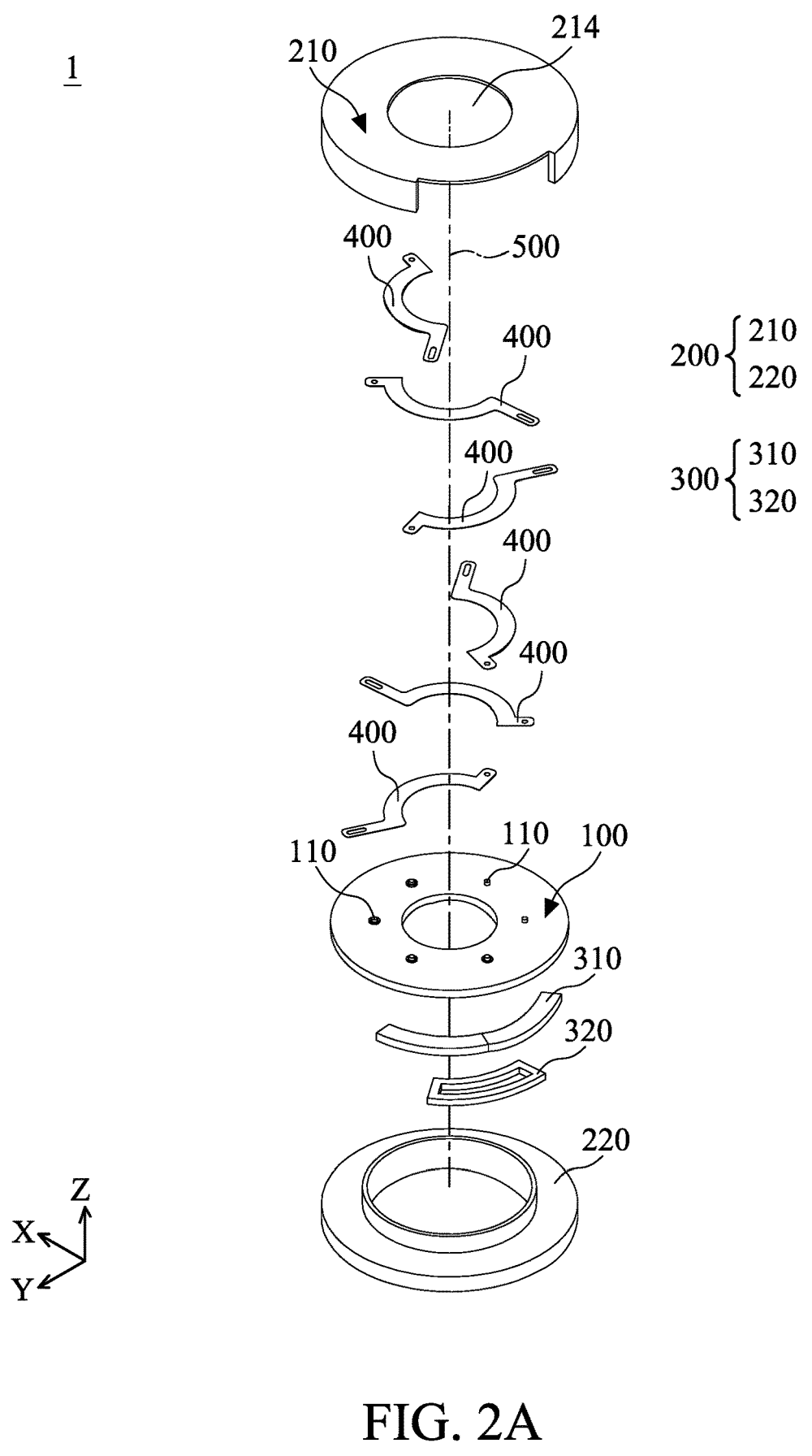

Please refer to FIG. 1 and FIG. 2A. FIG. 1 is a front perspective view of a optical element driving mechanism 1, according to certain aspects of the present disclosure. FIG. 2A is an exploded perspective view of the optical element driving mechanism 1, according to certain aspects of the present disclosure. The optical element driving mechanism 1 includes a movable part 100, a fixed part 200, and a driving assembly 300. The movable part 100 is for connecting a plurality of optical elements 400. The fixed part 200 includes a housing 210 and a base 220. In this embodiment, six optical elements 400 are shown. The movable part 100 may move relative to the fixed part 200. The optical element driving mechanism 1 and the optical elements 400 form an optical module. That is, the optical module includes the optical element driving mechanism 1 and the optical elements 400.

The driving assembly 300 drives the movable part 100 to move relative to the fixed part 200. The driving assembly 300 includes a magnetic element 310 and a coil 320. In this embodiment, the magnetic element 310 is disposed on the movable part 100, and the coil 320 is disposed on the fixed part 200. In other embodiments, the magnetic element 310 may be disposed on the fixed part 200, and the coil 320 may be disposed on the movable part 100. The magnetic element 310 is driven to move relative to the coil 320 by the electromagnetic driving force generated between the magnetic element 310 and the coil 320. The movement of the magnetic element 310 drives the movement of the movable part 100.

Figure 2B:
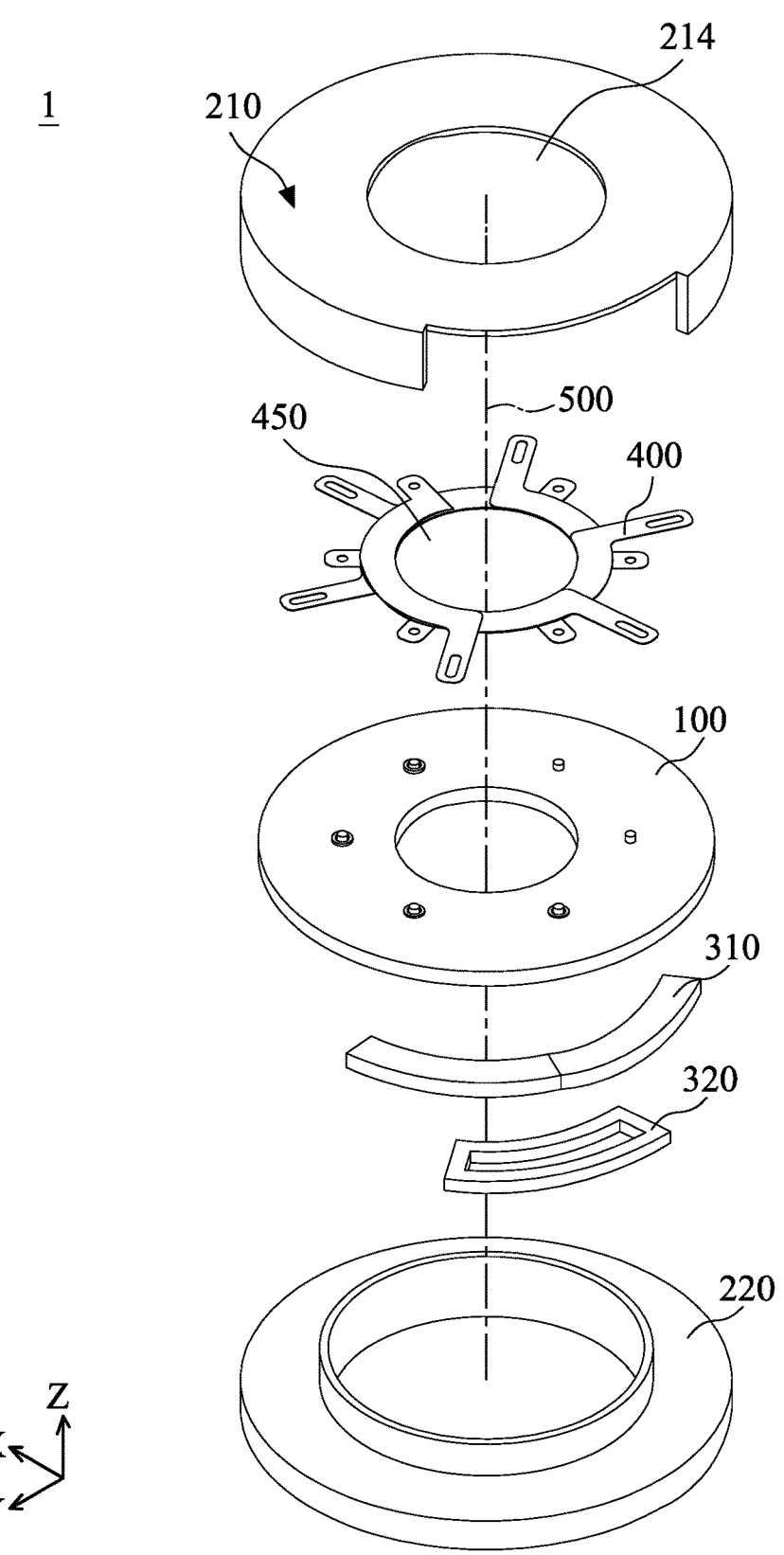
FIG. 2B is another exploded perspective view of the optical element driving mechanism assembled with optical elements, according to certain aspects of the present disclosure.

Next, please refer to FIG. 2B. FIG. 2B is another exploded perspective view of the optical element driving mechanism 1, according to certain aspects of the present disclosure, with six optical elements 400 assembled. Six optical elements 400 are overlapped and assembled with each other in the Z-axis direction, and the assembled optical elements 400 have an opening 450. The overlapping and assembling of the optical elements 400 in the Z-axis direction may save the space of the optical element driving mechanism 1 in the Z-axis direction.

Figure 3:
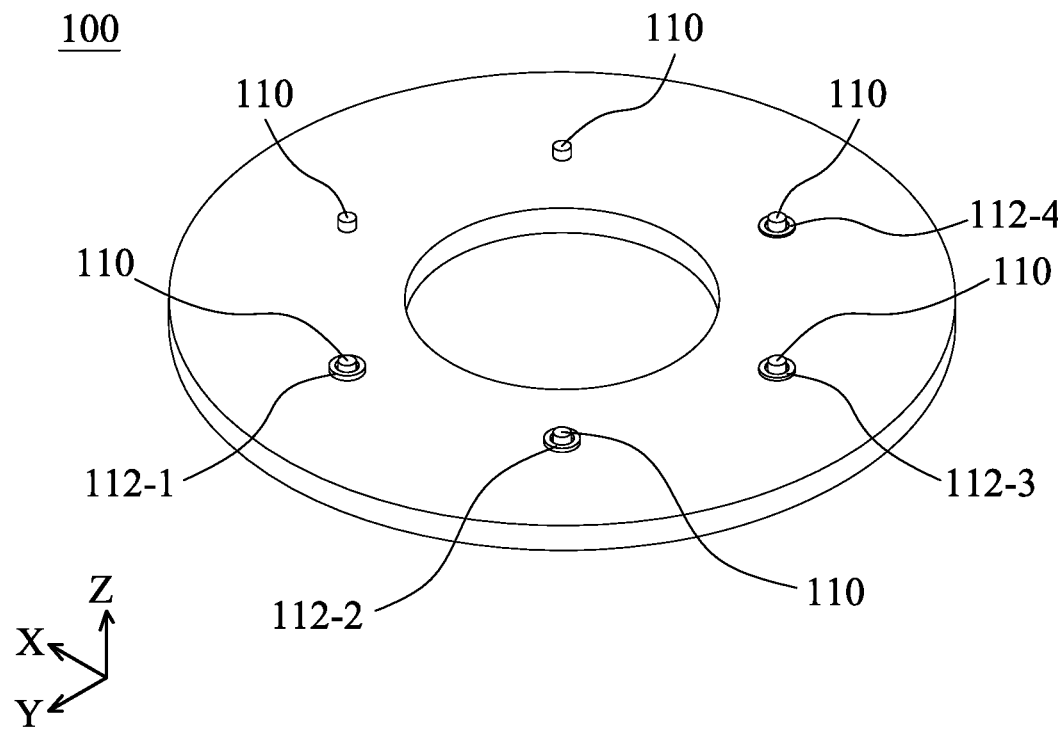
FIG. 3 is a front perspective view of a movable part of the optical element driving mechanism, according to certain aspects of the present disclosure.

Please refer to FIG. 2B and FIG. 3 together. FIG. 3 is a front perspective view of the movable part 100 of the optical element driving mechanism 1, according to certain aspects of the present disclosure. The movable part 100 includes six movable part protrusions 110. The movable part protrusions 110 are for driving the optical element 400, and the movable part protrusions 110 may move relative to the fixed part 200. The optical elements 400 are connected to the movable part 100 via the movable part protrusions 110.

The movable part protrusion 110 may have a step part, and the step parts of different movable part protrusions 110 have different heights. In this embodiment, there are four step parts 112-1, 112-2, 112-3, and 112-4, and there are two movable part protrusions 110 without step parts. In other embodiments, different configurations may also be provided, for example, all movable part protrusions 110 may have step parts, or all movable part protrusions 110 may have no step parts, etc.

The heights of the step parts 112-1, 112-2, 112-3, and 112-4 vary according to the position and height of the corresponding optical element 400. As mentioned above, the optical elements 400 are overlapped and assembled with each other in the Z-axis direction, connected to the movable part protrusions 110, and are sequentially arranged on the step parts 112-1, 112-2, 112-3, 112-4 and a surface of the movable part 100. In this embodiment, the optical element 400 with a higher position (on the Z axis) is disposed on the step parts 112-1, 112-2, 112-3, 112-4, while the optical element 400 with a lower position is disposed on the surface of the movable part 100.

The step part corresponding to the movable part protrusion 110 of the optical element 400 located at a higher position has a higher height. For example, the step part 112-1 in FIG. 3 has a higher height than the step part 112-2, and the position of the optical element 400 corresponding to the step part 112-1 is higher than the position of the optical element 400 corresponding to the step part 112-2. And so on, the step part 112-2 has a higher height than the step part 112-3, and the position of the optical element 400 corresponding to the step part 112-2 is higher than the position of the optical element 400 corresponding to the step part 112-3. The step part 112-3 has a higher height than the step part 112-4, and the position of the optical element 400 corresponding to the step part 112-3 is higher than the position of the optical element 400 corresponding to the step part 112-4. Placing the optical elements 400 at different heights prevents the optical elements 400 from interfering with each other during movement.

Figure 4:
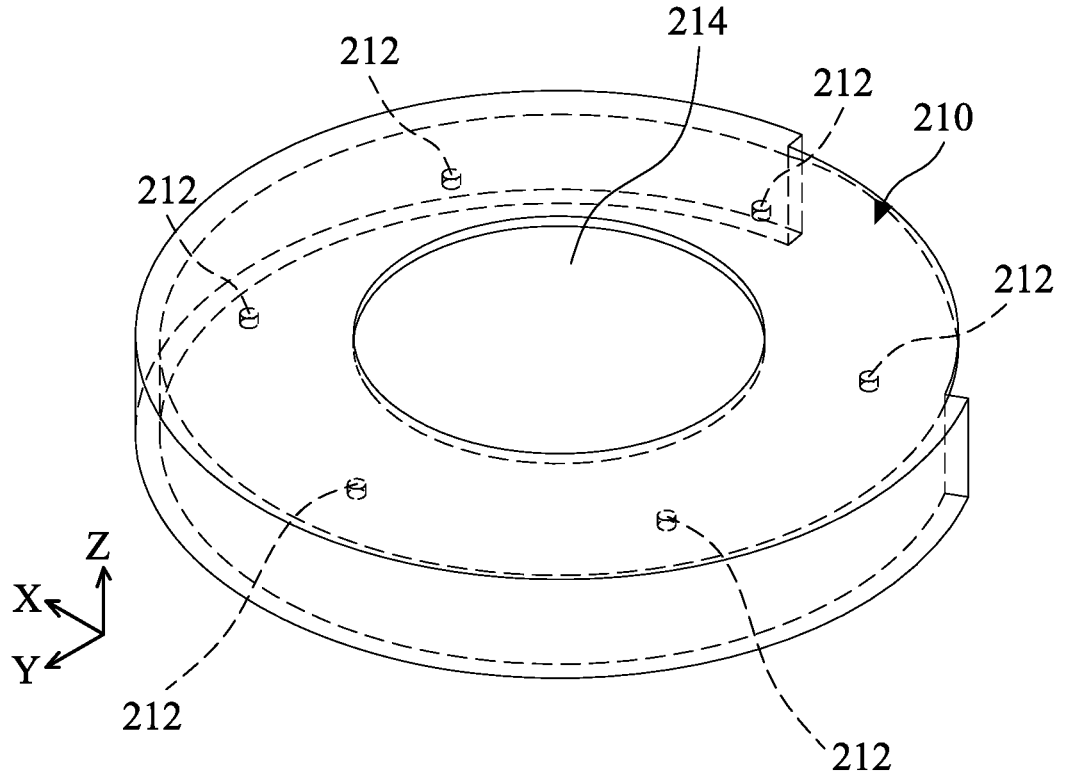
FIG. 4 is a front perspective view of a housing of the optical element driving mechanism, according to certain aspects of the present disclosure, with covered parts shown in dotted lines for illustrative purposes.

Please refer to FIG. 2B and FIG. 4 together. FIG. 4 is a front perspective view of the housing 210 of the optical element driving mechanism 1, according to certain aspects of the present disclosure, with the covered parts shown in dotted lines for illustrative purposes. The housing 210 includes six fixed part protrusions 212, which are disposed on the inner surface of the housing 210 and extend towards the base 220. The fixed part protrusions 212 guide the optical elements 400. The optical elements 400 are connected to the fixed part 200 via the fixed part protrusions 212. The movable part protrusions 110 may move relative to the fixed part protrusions 212. The optical element 400 may move relative to the fixed part protrusions 212. The housing 210 further has a light inlet 214, and an optical axis 500 that passes through the light inlet 214. The housing 210 is fixedly connected to the base 220.

Figure 5:
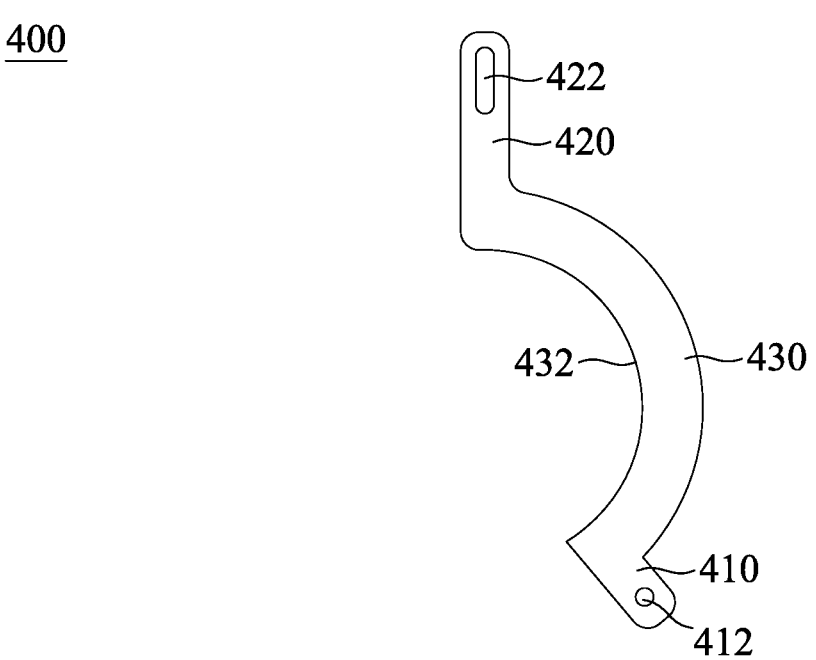
FIG. 5 is a top view of one of optical elements of the optical element driving mechanism, according to certain aspects of the present disclosure.

Please refer to FIG. 2B and FIG. 5 together. Each optical element 400 includes a movable connection part 410, a fixed connection part 420, and a middle part 430. Each of the movable connection parts 410 has a hole 412. Each fixed connection part 420 has a groove 422. The middle part 430 is located between the movable connection part 410 and the fixed connection part 420. The middle parts 430 each have one side 432 facing the optical axis 500. In this embodiment, there are six optical elements 400, but in other embodiments, there may be a different number of optical elements.

In this embodiment, the optical element 400 has a generally rectangular movable connection part 410, a fixed connection part 420, and a generally arc-shaped middle part 430. However, in other embodiments, the optical elements 400 may have other shapes. The length of the movable connection part 410 is shorter than the length of the fixed connection part 420, and the movable connection part 410 and the fixed connection part 420 are not parallel. The movable connection part 410 and the fixed connection part 420 extend from both ends of the middle part 430 at an angle. The angle varies according to different configurations of the optical elements 400, but it should be noted that an excessively large angle may cause the optical elements 400 to interfere with each other when moving.

Figure 6:
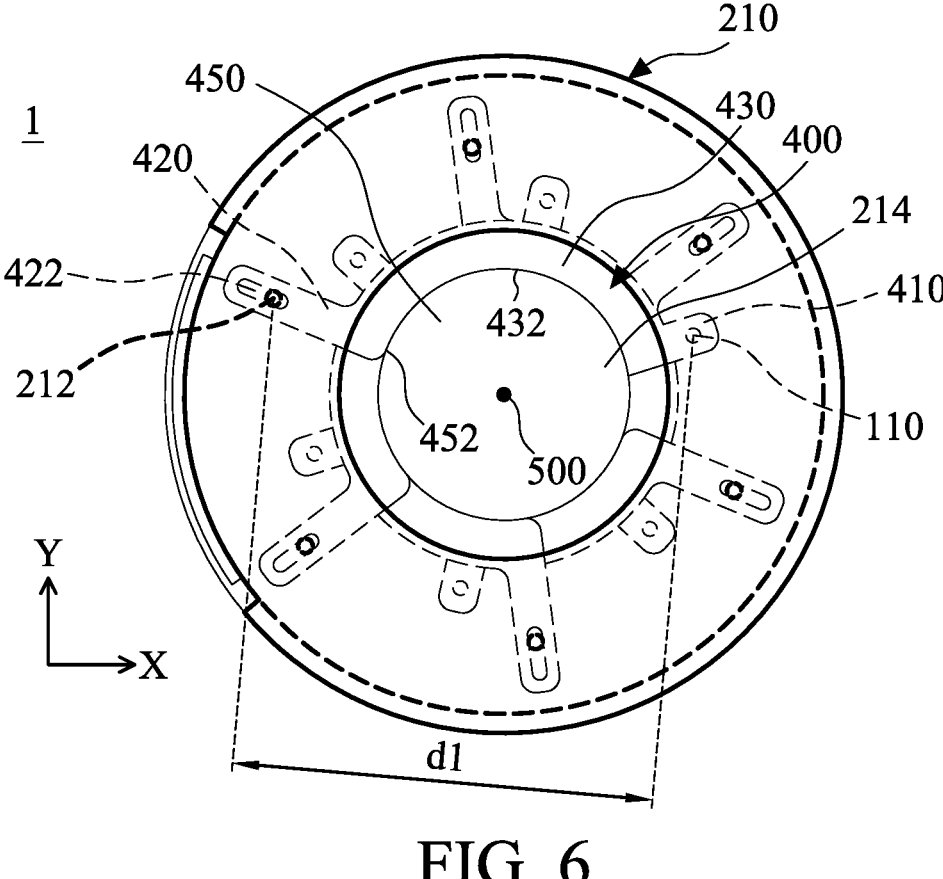
FIG. 6 is a top perspective view of the optical element driving mechanism, according to certain aspects of the present disclosure, with parts covered by the housing shown in dotted lines for illustrative purposes.

Next, please refer to FIG. 2B and FIG. 6 together. FIG. 6 is a top perspective view of the optical element driving mechanism 1, according to certain aspects of the present disclosure, with the parts covered by the housing 210 shown in dotted lines for illustrative purposes. Each movable part protrusion 110 and each fixed part protrusion 212 are connected through an optical element 400. The movable connection part 410 corresponds to the movable part protrusion 110. The movable part protrusion 110 passes through the hole 412 of the movable connection part 410 (see FIG. 5), so that the optical element 400 sequentially contacts the surface of the step parts 112-1, 112-2, 112-3, 112-4 and the surface of the movable part 100.

The fixed connection part 420 corresponds to the fixed part protrusion 212. The fixed part protrusion 212 passes through the groove 422 of the fixed connection part 420. The fixed part protrusion 212 may slide relative to the fixed connection part 420 along the groove 422. Therefore, the movable part 100 is movably connected to the fixed part 200 via the optical element 400 (FIG. 2B). The movable connection part 410 is connected to the fixed connection part 420 via the middle part 430. The sides 432 of the middle parts 430 of all the optical elements 400 form an opening 450, and the optical axis 500 passes through the opening 450.

When viewed along the direction parallel to the optical axis 500 (i.e., the Z-axis direction), the movable part protrusion 110 and the fixed part protrusion 212 connected to each optical element 400 have a distance d1. In some embodiments, the distance d1 is greater than half the maximum size of the light inlet 214. It should be noted that if the distance d1 is less than half of the maximum size of the light inlet 214, the optical element 400 may not be able to form the opening 450. In this embodiment, the distance d1 is larger than the maximum size of the light inlet 214.

When viewed along the direction parallel to the optical axis 500 (i.e., the Z-axis direction), the assembled optical elements 400 as a whole presents an alternate structure of movable connection parts 410 and fixed connection parts 420. Light may pass through the light inlet 214 and the opening 450 formed by the sides 432 of the optical elements 400. The structure of the opening 450 depends on the arrangement of the sides 432 of the optical element 400, so the light that may pass through the opening 450 depends on the arrangement of the optical elements 400.

The movable part protrusion 110 of the movable part 100 passes through the hole 412 of the movable connection part 410 (FIG. 6). The movement of the movable part 100 drives the optical element 400 to move relative to the fixed part 200. The movement of the optical element 400 causes the grooves 422 (FIG. 6) to slide relative to the fixed part protrusion 212, so that the opening 450 formed by the sides 432 of the middle parts 430 of the optical elements 400 changes as the grooves 422 slides.

The optical element 400 may move between a first position, a second position, and a third position. The optical element 400 in the first position forms the largest opening 450. The optical element 400 in the third position forms the smallest opening 450. The size of the opening 450 formed by the optical element 400 in the second position is between the size of the opening 450 formed by the optical element 400 in the first position and the size of the opening 450 formed by the optical element 400 in the third position. In this embodiment, the size of the opening 450 is smaller than the light inlet 214 in any position.

Figure 7A:
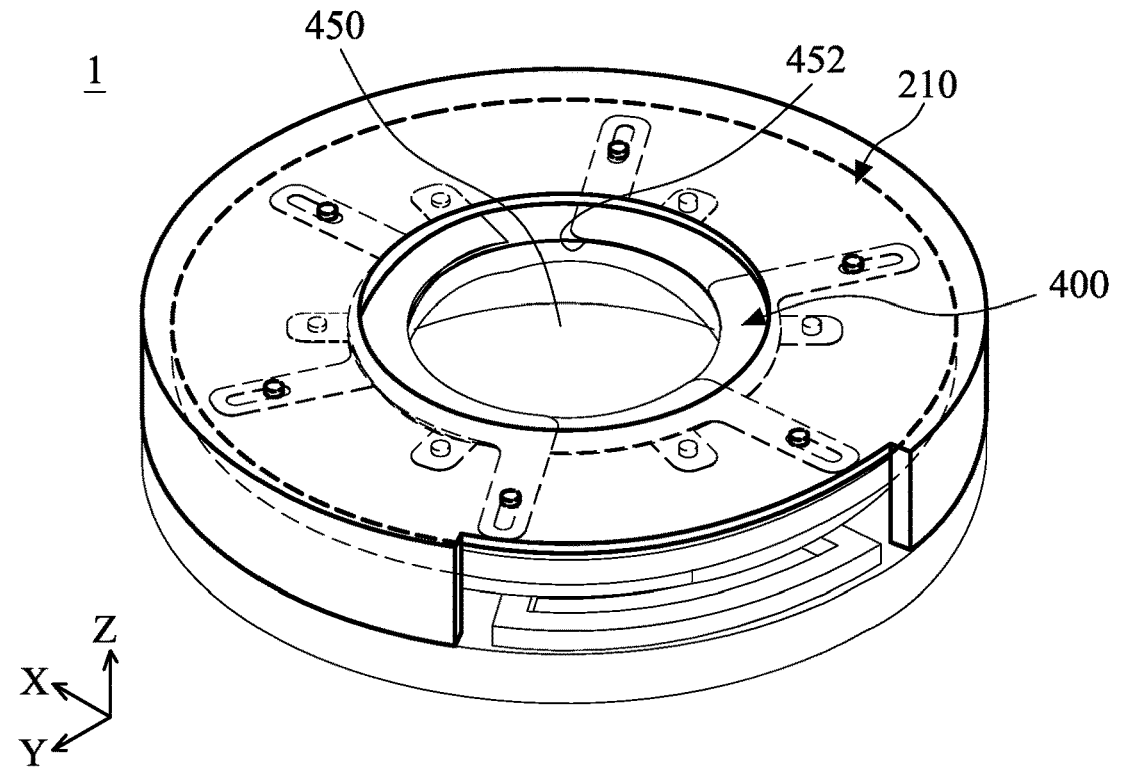
FIG. 7A is a front perspective view of an optical element in a first position, according to certain aspects of the present disclosure, with parts covered by the housing shown in dotted lines for illustrative purposes.
Figure 7B:
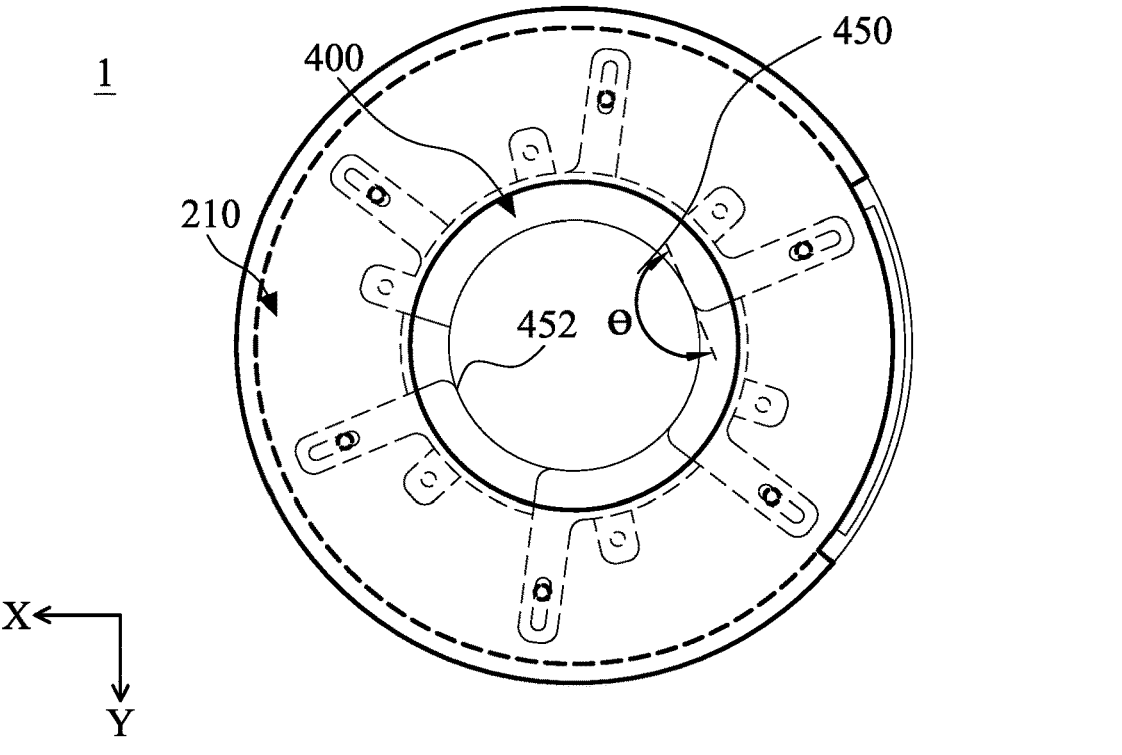
FIG. 7B is a top view of an optical element in the first position, according to certain aspects of the present disclosure, with the parts covered by the housing shown in dotted lines for illustrative purposes.

Please refer to FIG. 7A and FIG. 7B together. FIG. 7A is a front perspective view of the optical elements 400 in a first position, according to certain aspects of the present disclosure, with the parts covered by housing 210 shown in dotted lines for illustrative purposes. FIG. 7B is a top view of the optical elements 400 in a first position, according to certain aspects of the present disclosure, with the parts covered by housing 210 shown in dotted lines for illustrative purposes. In the first position, the opening 450 formed by the optical elements 400 is close to a circle, or the opening 450 is close to an apeirogon.

Figures 8A, 8B:
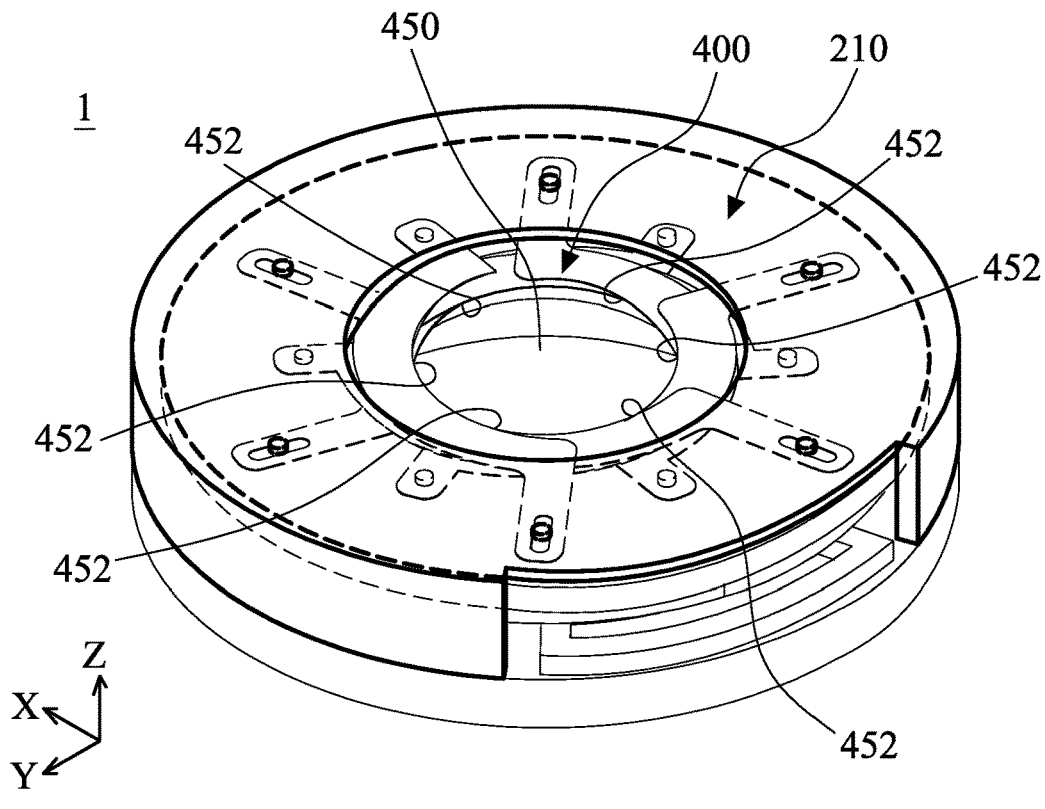
FIG. 8A is a front perspective view of the optical element in a second position, according to certain aspects of the present disclosure, with the parts covered by the housing shown in dotted lines for illustrative purposes.
FIG. 8B is a top view of the optical element in the second position, according to certain aspects of the present disclosure, with the parts covered by the housing shown in dotted lines for illustrative purposes.

Please refer to FIG. 8A and FIG. 8B together. FIG. 8A is a front perspective view of the optical elements 400 in a second position, according to certain aspects of the present disclosure, with the parts covered by housing 210 shown in dotted lines for illustrative purposes. FIG. 8B is a top view of the optical elements 400 in a second position, according to certain aspects of the present disclosure, with the parts covered by housing 210 shown in dotted lines for illustrative purposes. The driving assembly 300 drives the movable part 100 to move relative to the fixed part 200, for example, to rotate the movable part 100 in a counterclockwise direction relative to the fixed part 200. The optical elements 400 move from the first position in FIG. 7A to the second position in FIG. 8A. In the second position, the opening 450 formed by the optical elements 400 is not circular, and the shape of the opening 450 is similar to a hexagon.

Figure 9A:
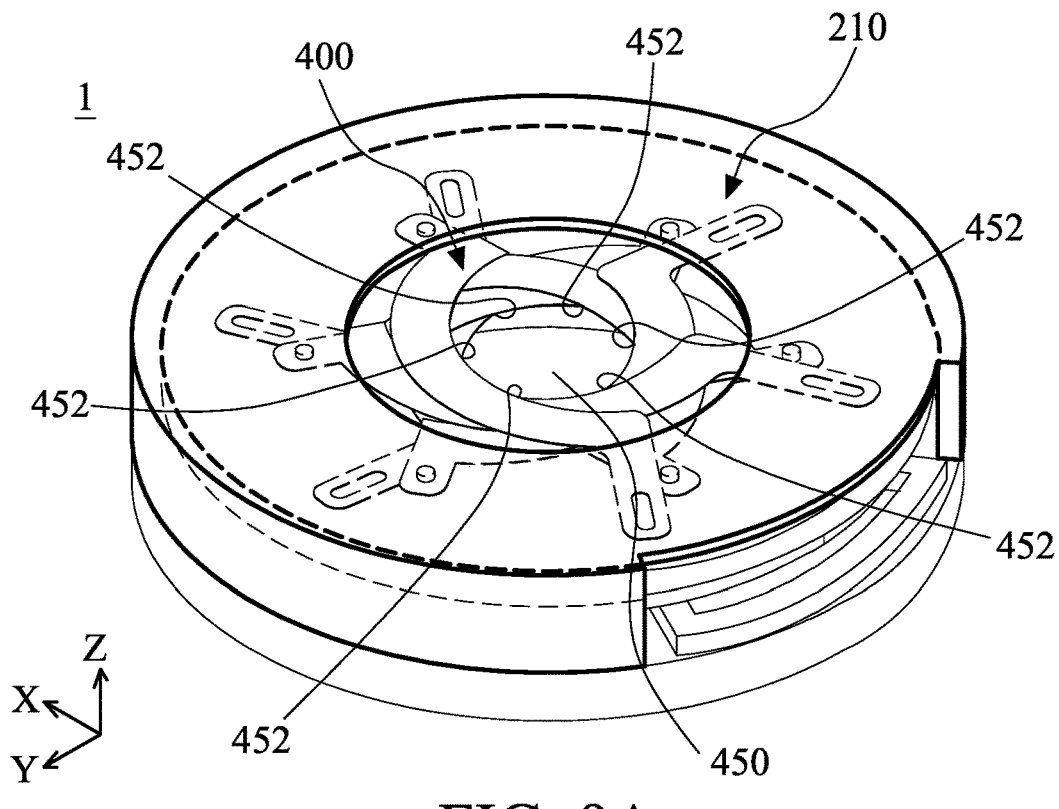
FIG. 9A is a front perspective view of an optical element in a third position, according to certain aspects of the present disclosure, with the parts covered by the housing shown in dotted lines for illustrative purposes.
Figure 9B:
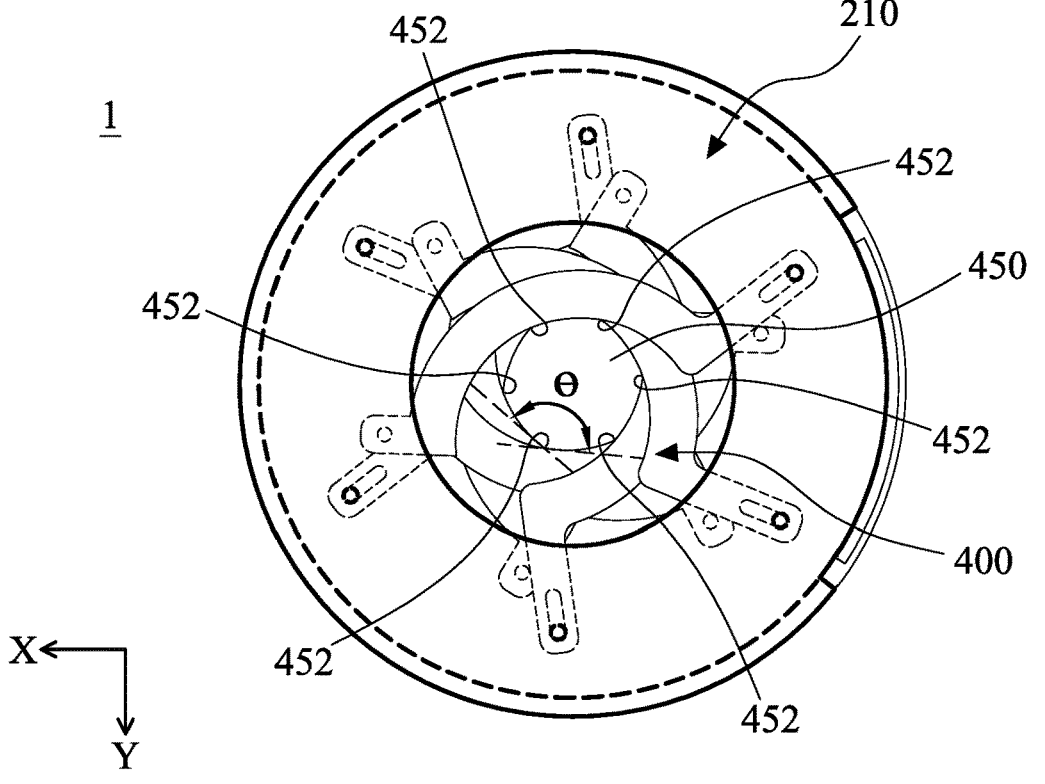
FIG. 9B is a top view of the optical element in the third position, according to certain aspects of the present disclosure, with the parts covered by the housing shown in dotted lines for illustrative purposes.

Please refer to FIG. 9A and FIG. 9B together. FIG. 9A is a front perspective view of optical element 400 in a third position, according to certain aspects of the present disclosure, with the parts covered by housing 210 shown in dotted lines for illustrative purposes. FIG. 9B is a top view of the optical elements 400 in a third position, according to certain aspects of the present disclosure, with the parts covered by housing 210 shown in dotted lines for illustrative purposes. The driving assembly 300 drives the movable part 100 to continue to rotate counterclockwise relative to the fixed part 200. The optical elements 400 move from the second position in FIG. 8A to the third position in FIG. 9A. In the third position, the opening 450 formed by the optical elements 400 is not circular, and the shape of the opening 450 is similar to a hexagon.

Next, please refer to FIG. 7B, FIG. 8B, and FIG. 9B. The area of the opening 450 when the optical elements 400 are located in the first position is different from the area of the opening 450 when the optical elements 400 are located in the second position. The area of the opening 450 when the optical elements 400 are in the second position is different from the area of the opening 450 when the optical elements 400 are in the third position. The structure of the opening 450 when the optical elements 400 are in the second position is different from the structure of the opening 450 when the optical elements 400 are in the third position. That is, the opening 450 formed by the sides 432 in the second position is different from the opening 450 formed by the sides 432 in the third position.

In FIG. 9B, the opening 450 has a rotational symmetrical structure, and six vertices 452 are formed where the six sides 432 intersect. In this embodiment, the opening 450 in the third position has six vertices 452, but in other embodiments the number of vertices 452 may be greater or fewer. The two tangents of the two intersecting sides 432 at the vertex 452 form an angle $\theta$.

The number of vertices 452 when the optical elements 400 are in the second position is the same as the number of vertices 452 when the optical elements 400 are in the third position. However, the opening 450 when the optical elements 400 are in the second position has a different shape than the opening 450 when the optical elements 400 are in the third position. The number of vertices 452 when the optical elements 400 are in the first position is different from the number of vertices 452 when the optical elements are in the second position. When the optical elements 400 are in the first position, since the sides 432 coincide with each other and have an infinite number of intersections, the opening 450 has an infinite number of vertices 452. When the optical elements 400 are in the third position, the angle $\theta$ between the vertices 452 is less than 160 degrees. When the optical elements 400 are in the second position, the angle $\theta$ between the vertices 452 is less than 180 degrees and greater than 160 degrees. When the optical elements 400 are in the first position, since the sides 432 coincide with each other and the two tangents of the sides 432 at the vertex 452 approximately coincide, the angle $\theta$ between the vertices 452 is approximately about 180 degrees.

As mentioned above, by driving the movable part 100 and the optical elements 400 to move relative to the fixed part 200 by the driving assembly 300, the size of the opening 450 of the sides 432 of the middle parts 430 of the optical elements 400 may be controlled, and thus the size of the opening 450 may be controlled. The amount of light entering through the opening 450 being controlled may achieve a better optical quality.

In summary, the present disclosure provides an optical element driving mechanism that may save space and achieve miniaturization. At the same time, its structure may also effectively reduce operational errors caused by interference during the operation of optical elements, stabilize the internal structure, and provide more stability and better optical quality.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical element driving mechanism, comprising:
a movable part for connecting a plurality of optical elements;
a fixed part, wherein the movable part is movable relative to the fixed part;
a driving assembly for driving the movable part to move relative to the fixed part; and
a plurality of step parts, each corresponding to one of the optical elements, wherein the heights of the step parts vary according to the position and height of the corresponding optical element.

2. The optical element driving mechanism as claimed in claim 1, wherein the optical element driving mechanism has at least three optical elements.

3. The optical element driving mechanism as claimed in claim 1, further comprising:
a movable part protrusion for driving the optical elements to move relative to the fixed part; and
a fixed part protrusion for guiding the optical elements;
wherein the movable part protrusion is movable relative to the fixed part protrusion.

4. The optical element driving mechanism as claimed in claim 3, wherein the optical elements are movable relative to the movable part protrusion and the fixed part protrusion.

5. The optical element driving mechanism as claimed in claim 3, wherein the fixed part has a light inlet, wherein an optical axis passes through the light inlet.

6. The optical element driving mechanism as claimed in claim 5, wherein each one of the optical elements includes:

a movable connection part corresponding to the movable part protrusion;
a fixed connection part corresponding to the fixed part protrusion; and
a middle part through which the movable connection part is connected to the fixed connection part;
wherein the middle part is located between the movable connection part and the fixed connection part.

7. The optical element driving mechanism as claimed in claim 6, wherein the sides of the middle parts of the optical elements form an opening, and the optical axis passes through the opening.

8. The optical element driving mechanism as claimed in claim 7, wherein the opening has a rotational symmetrical structure and a plurality of vertices.

9. The optical element driving mechanism as claimed in claim 8, wherein when the optical elements are in a first position, the angle of the vertices is approximately 180 degrees.

10. The optical element driving mechanism as claimed in claim 9, wherein when the optical elements are in a second position, the angle of the vertices is less than 180 degrees and greater than or equal to 160 degrees.

11. The optical element driving mechanism as claimed in claim 10, wherein when the optical elements are in a third position, the angle of the vertices is less than 160 degrees.

12. The optical element driving mechanism as claimed in claim 11, wherein when the optical elements are in the second position, the area of the opening is different from the area of the opening when the optical elements are in the third position.

13. The optical element driving mechanism as claimed in claim 11, wherein when the optical elements are in the second position, the structure of the opening is different from the structure of the opening when the optical elements are in the third position.

14. The optical element driving mechanism as claimed in claim 11, wherein when the optical elements are in the second position, the number of vertices is the same as the number of vertices when the optical elements are in the third position.

15. The optical element driving mechanism as claimed in claim 5, wherein when viewed along the direction parallel to the optical axis, there is a distance between the movable part protrusion and the fixed part protrusion.

16. The optical element driving mechanism as claimed in claim 9, wherein when the optical elements are in the first position, the area of the opening is different from the area of the opening when the optical elements are in the second position.

17. The optical element driving mechanism as claimed in claim 9, wherein when the optical elements are in the first position, the number of vertices is different from the number of vertices when the optical elements are in the second position.

18. The optical element driving mechanism as claimed in claim 15, wherein the distance is greater than half the maximum size of the light inlet.

19. The optical element driving mechanism as claimed in claim 15, wherein the distance is greater than the maximum size of the light inlet.

* * * * *